(12) United States Patent
Rokkaku

(10) Patent No.: US 7,008,164 B2
(45) Date of Patent: Mar. 7, 2006

(54) AUTOMATED GUIDED VEHICLE

(75) Inventor: Eiichi Rokkaku, Kyoto (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 172 days.

(21) Appl. No.: 10/424,126

(22) Filed: Apr. 28, 2003

(65) Prior Publication Data

US 2004/0042885 A1  Mar. 4, 2004

(30) Foreign Application Priority Data

Aug. 28, 2002  (JP)  ............................ P2002-249492

(51) Int. Cl.
*B60P 1/52*  (2006.01)

(52) U.S. Cl. ............ 414/530; 198/370.09; 198/370.01; 198/371.3

(58) Field of Classification Search .......... 198/370.09, 198/370.1, 371.3; 414/529, 530
See application file for complete search history.

(56) References Cited

U.S. PATENT DOCUMENTS 3,709,450 A * 1/1973 Watts et al. ................. 410/79
4,752,000 A * 6/1988 Hodgin ................... 198/781.08
4,951,808 A * 8/1990 Collins et al. ......... 198/781.05
6,478,138 B1 * 11/2002 Edwards et al. ....... 198/370.06

* cited by examiner

*Primary Examiner*—Thomas J. Brahan
(74) *Attorney, Agent, or Firm*—Sughrue Mion, PLLC

(57) ABSTRACT

An automated guided vehicle has plural conveyors for transferring materials to be transferred mounted on a self-propelling dolly and juxtaposed in a transverse direction. Each of the conveyors includes plural part conveyors whose operation can be controlled individually and arranged in tandem in a transferred direction. One or three or more part conveyors may be disposed or arranged in tandem in the direction of the vehicular width. One or three or more part conveyors may be disposed or juxtaposed in the transverse direction.

5 Claims, 6 Drawing Sheets

AUTOMATED GUIDED VEHICLE

BACKGROUND OF THE INVENTION

1. Field of the Invention

The present invention relates to an automated guided vehicle that travels unmanned and improves the transfer and unloading of materials (articles) to be transferred.

2. Description of the Related Art

Conventionally, an automated guided vehicle (AGV) is known in which a conveyor for transferring materials to be transferred is provided on a dolly that travels unmanned. The conveyor transfers materials in an anteroposterior direction of the dolly. As shown in FIGS. 8A to 8C, automated guided vehicles 101 in conventional examples are driven to a terminal (end) of a belt conveyor 102 and are stopped. A material to be transferred 103 that is carried out from the terminal of the belt conveyor 102 is transferred onto a conveyor 104 provided on an upper surface of the automated guided vehicle 101.

Specifically, at the same time as the material to be transferred 103 is carried out from the belt conveyor 102 toward the automated guided vehicle 101, the conveyor 104 of the automated guided vehicle 101 is operated in synchronism with this belt conveyor 102, thereby transferring the material to be transferred 103 onto the conveyor 104 of the automated guided vehicle 101. Further, when the material to be transferred 103 transferred onto the conveyor 104 has moved to a vicinity of the center of the automated guided vehicle 101, the conveyor 104 is stopped. In this state, the automated guided vehicle 101 is caused to travel toward a next target, thereby the material to be transferred 103 is transported to that place.

The external size and the weight of the various materials to be transferred 103 that are transferred as described above are not fixed. A large-sized conveyor 104 is provided on the automated guided vehicle 101, as shown in FIG. 8A, and a small-sized conveyor 104 is provided on another automated guided vehicle 101, as shown in FIG. 8B. It is conceivable to selectively use these automated guided vehicles 101 having different specifications in accordance with the external size and the weight of the materials to be transferred 103.

It is difficult to make uniform the external size and the weight of the materials to be transferred 103 that are carried out from one belt conveyor 102. When the automated guided vehicle 101 provided with the small-sized conveyor 104 is used to receive a large material to be transferred 103, the material to be transferred 103 is too large to be transferred onto the small-sized conveyor 104. In this case, since the automated guided vehicle 101 must be replaced by one provided with the large-sized conveyor 104, extra time and labor are spent correspondingly.

Alternatively, when a small material to be transferred 103 is loaded on the large-sized conveyor 104 as shown in FIG. 8B, it becomes difficult to load other materials to be transferred (not shown) around the small material to be transferred 103. In other words, most of the loading space of the conveyor 104 becomes a dead space on which other materials to be transferred cannot be loaded.

In addition, as shown in FIG. 8C, to make utmost use of the loading space of the large-sized conveyor 104, an attempt may be made to load two or more materials to be transferred 103 in tandem in the transferring direction on one side of the large-sized conveyor 104. However, if an attempt is made to operate the conveyor 104 to load still other materials to be transferred (not shown) in the loading space adjacent to these materials to be transferred 103, the illustrated materials to be transferred 103 already loaded on the conveyor 104 fall off the automated guided vehicle 101.

SUMMARY OF THE INVENTION

The invention has been devised in view of the above-described problems, and an object of the invention is to provide an automated guided vehicle capable of efficiently transferring various materials to be transported irrespective of the external size and the weight of the materials to be transported.

According to a first aspect of the invention, there is provided an automated guided vehicle having: a plurality of conveyors juxtaposed in a direction perpendicular to a transferring direction of each conveyor that transfers a material to be transferred in the transferring direction; a plurality of driving sections for individually driving the juxtaposed conveyors; and a clutch, wherein the plurality of driving sections are interlockable with each other by the clutch.

Furthermore, in the automated guided vehicle in accordance with the invention, each of the plurality of conveyors includes a plurality of part conveyors that are arranged in tandem in the transferring direction and capable of being controlled individually.

DETAILED DESCRIPTION OF THE PREFERRED EMBODIMENTS

Figure 1:
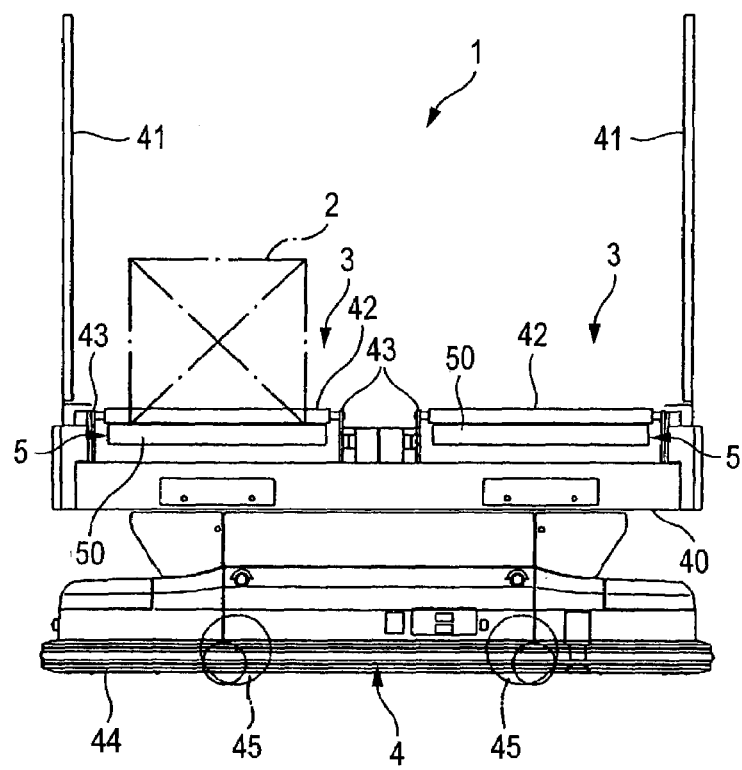
FIG. 1 is a side view of an automated guided vehicle according to an embodiment of the invention.
Figure 2:
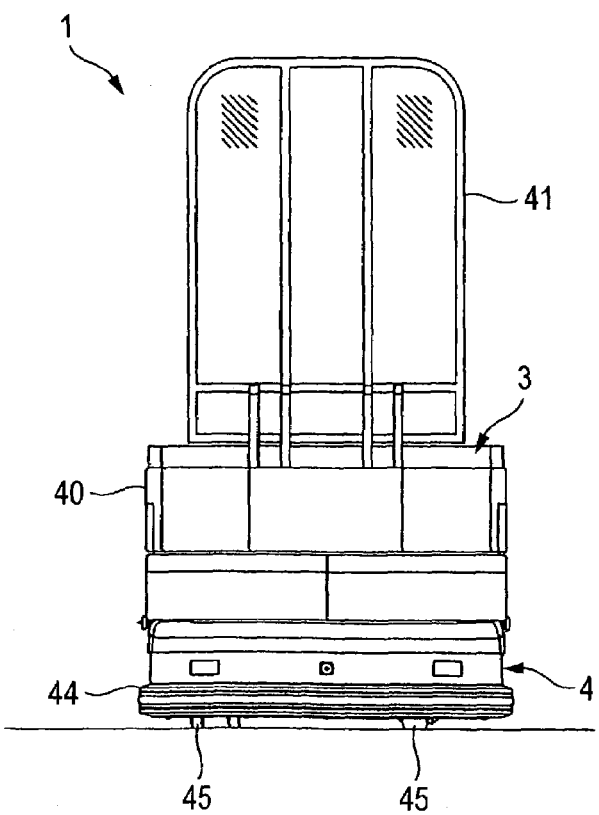
FIG. 2 is a front view of the automated guided vehicle.
Figure 3:
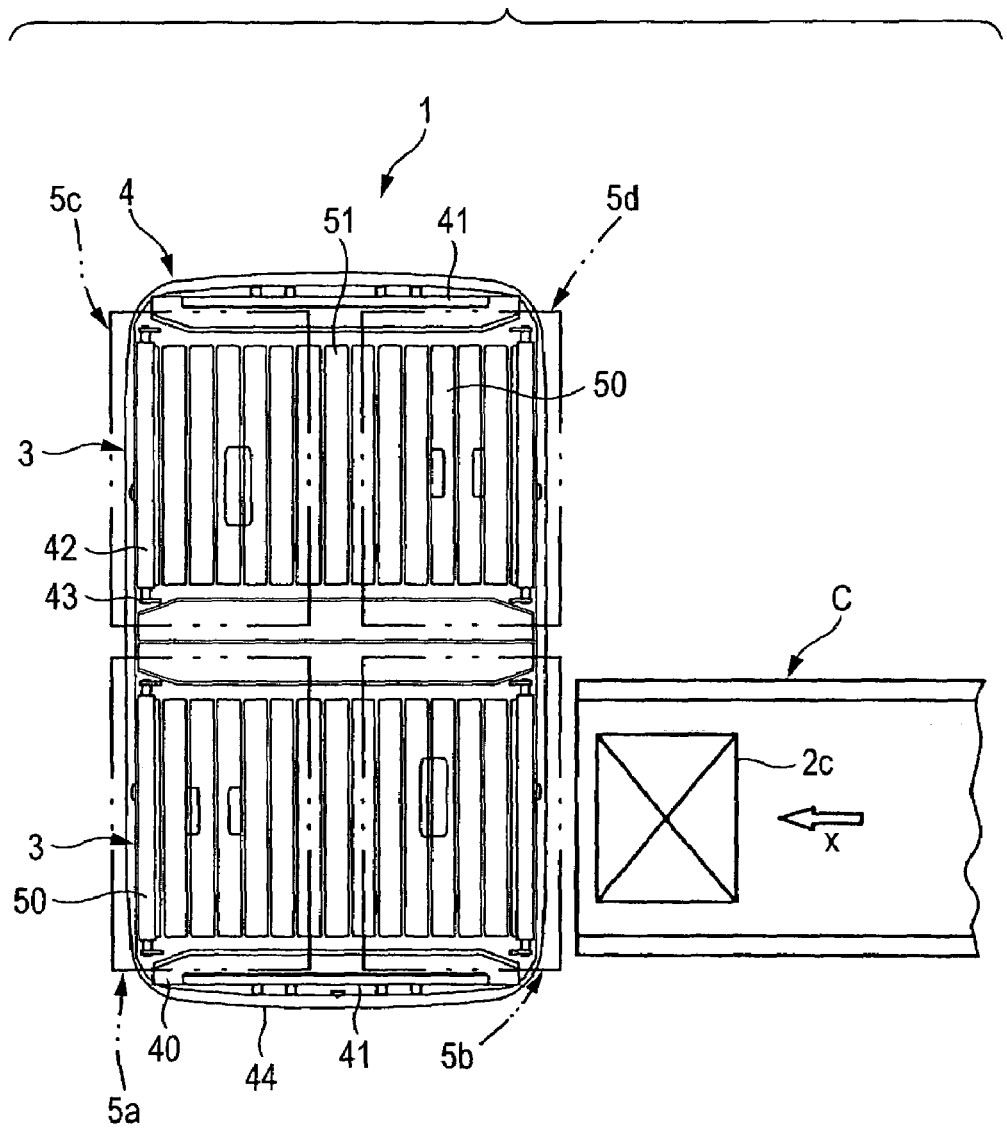
FIG. 3 is a plan view illustrating an example of usage of the automated guided vehicle.

Referring now to the drawings, a description will be given of an automated guided vehicle according to an embodiment of the invention. As shown in FIGS. 1, 2, and 3, an automated guided vehicle 1 is configured such that a plurality of conveyors 3 for transferring a material to be transferred 2 in a transferring direction (coinciding with the direction of the vehicular width) indicated by arrow x are juxtaposed in a direction (hereafter referred to as the anteroposterior direction) traversing the transferring direction and are mounted on a dolly 4 that is self-propelling.

Each of the plurality of conveyors 3 is configured such that a plurality of part conveyors 5 whose operation can be controlled individually are arranged in tandem in the transferring direction. Namely, as plotted by phantom lines in FIG. 3, a total of four part conveyors 5 are mounted on the dolly 4 with two part conveyors 5 making up each row in the transferring direction and two part conveyors 5 making up each row in the anteroposterior direction. The numbers of the conveyors 3 and the part conveyors 5 are not limited. For example, one or three or more part conveyors 5 may be disposed or arranged in tandem in the transferring direction. Still alternatively, one or three or more part conveyors 5 may be disposed or juxtaposed in the anteroposterior direction.

The aforementioned phrase "arranged in tandem" refers to the part conveyors 5 arranged in a row along the transferring direction in which the material to be transferred 2 is transferred, and means that the material to be transferred 2 can be smoothly delivered between the part conveyors 5 arranged in tandem in conjunction with the operation of these part conveyors 5. Meanwhile, the term "juxtaposed" means that the mutually adjacent part conveyors 5 separately transfer the material to be transferred 2 in parallel directions.

FIGS. 1 and 2 show a side view and a front view of the automated guided vehicle 1, respectively. As shown in these drawings, the plurality of conveyors 3 are supported on the upper surface of the dolly 4 via a support 40. A pair of stopper frames 41 respectively rises from a front end and a rear end of the support 40. The pair of stopper frames 41 prevent the materials to be transferred 2 from shifting or falling off in the anteroposterior direction of the dolly 4.

Guide rollers 42 for smoothly introducing the material to be transferred 2 to the conveyor 3 side are juxtaposed on the support 40 at positions respectively corresponding to the two rows of the conveyors 3. To prevent the material to be transferred 2 from falling off the conveyor 3 due to the inertial force when the dolly 4 meanders, the guide rollers 42 are supported at a position slightly higher than the conveyors 3 by means of brackets 43. A bumper 44 is attached to the periphery of the dolly 4.

The dolly 4 has mounted thereon wheels 45, a steering device, a driving device, and a battery (not shown) for supplying electric power to these devices, and is self-propelling, as described above. The term "self-propelling" referred to herein means that the dolly 4 itself travels on, for example, a floor surface within a warehouse by starting the aforementioned driving device by radio guidance or the like, or travels while being guided by a predetermined track such as a rail.

The aforementioned steering device and driving device permit autonomous traveling under control by remote operation or on the basis of positional information using sensors or the like. Each part conveyor 5 is capable of transferring the material to be transferred 2 in the transferring direction or stopping it on the dolly 4 as the driving of a group of rollers 50 is controlled. A belt conveyor may be used as the part conveyor 5.

Next, a description will be given of the operation of the automated guided vehicle 1. The operation of the plurality of conveyors 3 is individually controlled, and the operation of the plurality of part conveyors 5 is also individually controlled. It should be noted that, due to the convenience of explanation, the four part conveyors 5 are distinguished by being denoted by reference numerals 5a, 5b, 5c, and 5d depending on their arrangement. Similarly, the materials to be transferred 2 are also distinguished by being denoted by reference numerals 2a, 2b, 2c, and 2d.

Figure 4:
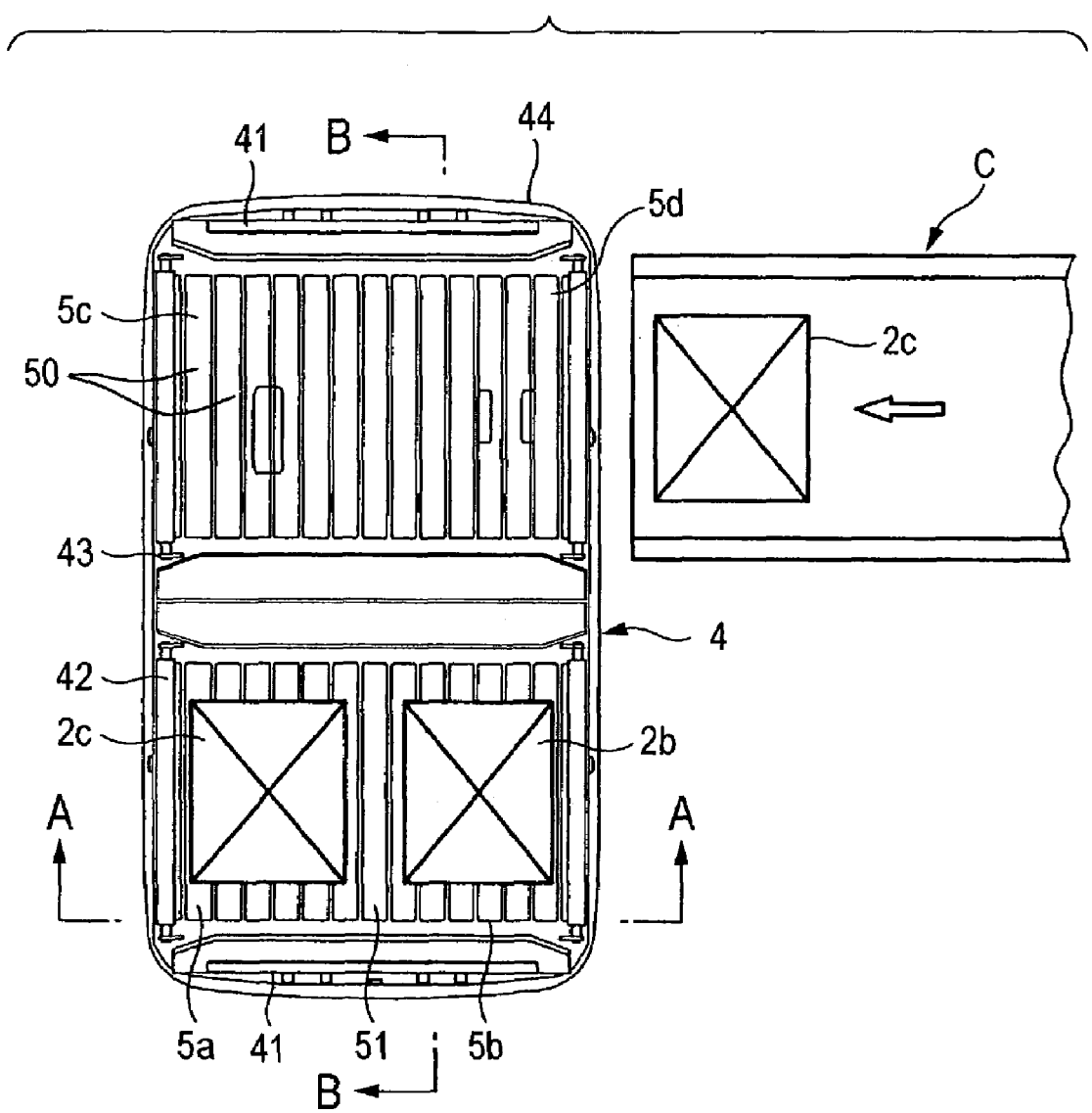
FIG. 4 is a plan view illustrating another example of usage of the automated guided vehicle.

Namely, the compact material to be transferred 2a that is carried out from the conveyor C shown in FIG. 3 is first transferred onto one conveyor 3 to make effective use of the overall loading space of the two rows of conveyors 3. The material to be transferred 2a is further moved onto the inner side of the one conveyor 3, i.e., the part conveyor 5a. Subsequently, as shown in FIG. 4, to transfer the material to be transferred 2b onto the part conveyor 5b, the transfer can be effected by operating only the part conveyor 5b in a state in which the part conveyor 5a is stopped. For this reason, the material to be transferred 2b can be transferred onto the part conveyor 5b without causing the material to be transferred 2a to fall off the one conveyor 3.

Further, as shown in FIG. 4, even if the loading space of the one conveyor 3 has been occupied by the two materials to be transferred 2a and 2b, the material to be transferred 2c can be transferred onto the part conveyors 5c and 5d making up the other conveyor 3. Even if the loading space of the part conveyor 5c is occupied by this material to be transferred 2c, another material to be transferred 2 can be further transferred onto the part conveyor 5d. For this reason, up to four materials to be transferred 2 can be loaded in the overall loading space of the two rows of conveyors 3. Furthermore, even if the size of the material to be transferred 2c is such as to occupy the entire loading space of the other conveyor 3, up to three materials to be transferred 2 can be loaded in the overall loading space of the two rows of conveyors 3. Accordingly, the conventional dead space does not practically occur.

Figure 5:
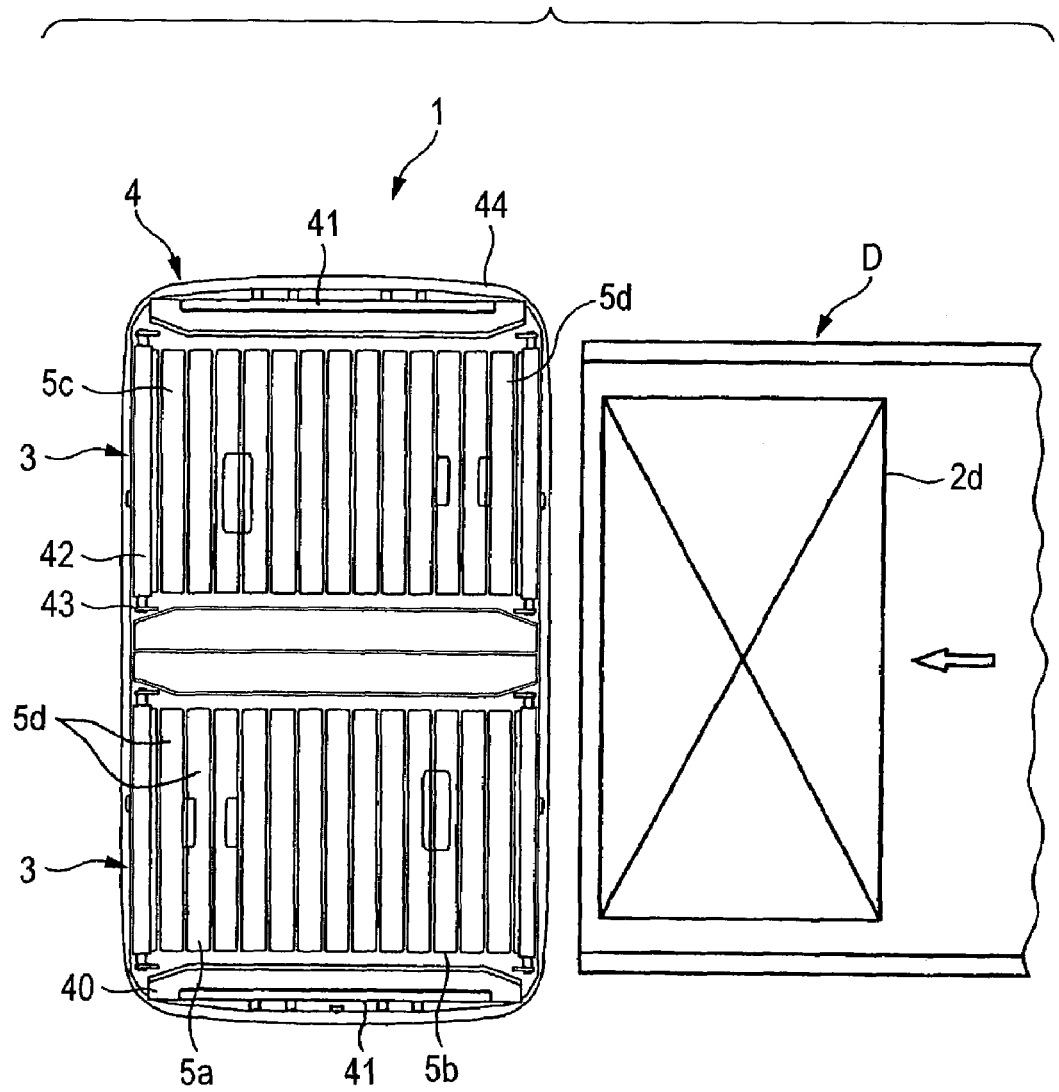
FIG. 5 is a plan view illustrating still another example of usage of the automated guided vehicle.

In addition, in a case where, as shown in FIG. 5, the material to be transferred 2d having such a large size as to occupy the entire loading space of the two rows of conveyors 3 is carried out from a conveyor D, such a large-sized material to be transferred 2d can be transferred onto the two rows of conveyors 3 by simultaneously operating the two rows of conveyors 3. In this process of transfer, the two rows of conveyors 3 are interlocked with each other by being mechanically coupled with each other. A description will be given below of the specific configuration thereof together with the mechanical structure of the conveyors 3 and the part conveyors 5.

Figure 6:
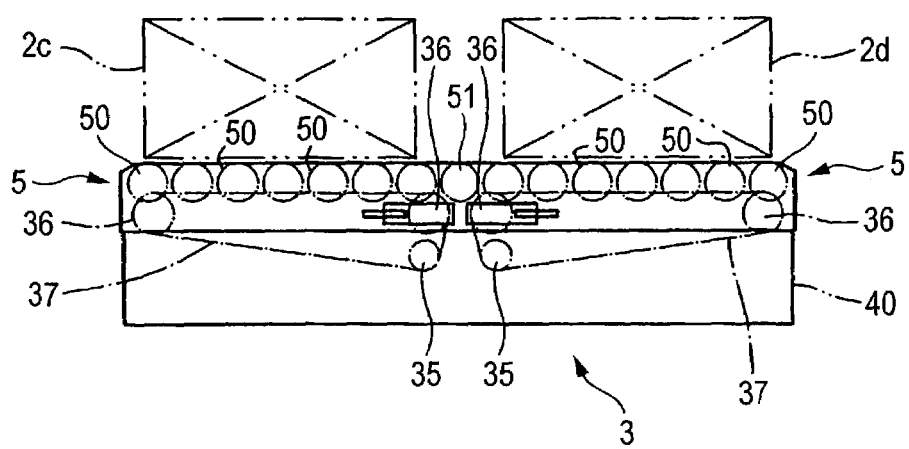
FIG. 6 is a cross-sectional view taken along line A—A of FIG. 4.
Figure 7:
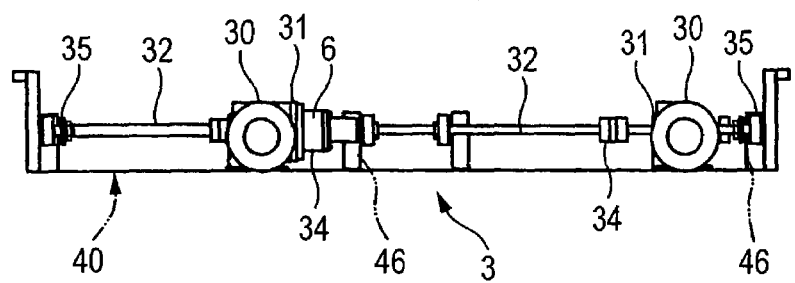
FIG. 7 is a cross-sectional view taken along line B—B of FIG. 4.
Figure 8A:
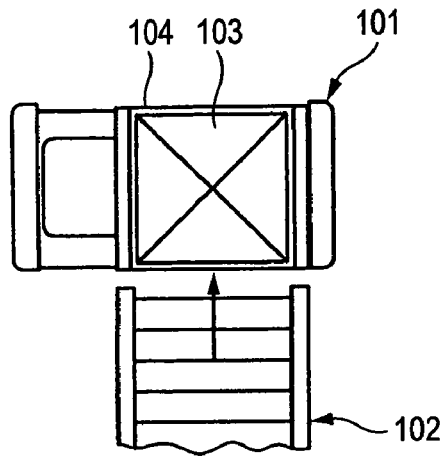
FIGS. 8A to 8C are plan views schematically illustrating conventional automated guided vehicles.
Figure 8B:
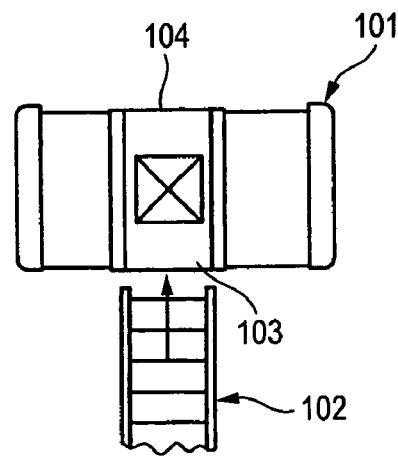
Figure 8C:
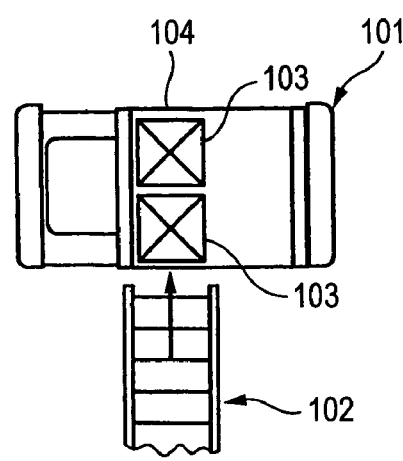

The plurality of conveyors 3 are made up of the plurality of part conveyors 5 as described before, and the plurality of these part conveyors 5 are driven by separate driving section. Specifically, as shown in FIGS. 6 and 7, the driving section of each of the individual part conveyors 5 includes a driving source 30 that is a DC motor, a reduction gear 31 provided integrally with this driving source 30, a drive shaft 32 passing through the reduction gear 31. A clutch 6 engages and disengages the two drive shafts 32.

The aforementioned two drive shafts 32 are the drive shafts 32 of the part conveyors 5 juxtaposed in the anteroposterior direction. These drive shafts 32 are arranged straightly in the transverse direction, and their axes are aligned with each other. The individual drive shafts 32 function as output shafts of the individual reduction gears 31. Bearings for supporting appropriate portions of the individual drive shafts 32 are provided on inner frame members 46 of the support 40. Each drive shaft 32 is an elongated shaft consisting of a plurality of pieces coupled with each other by elastic couplings 34. As the clutch 6, it is possible to use a mechanical friction clutch, an electromagnetic clutch, or the like. As the clutch 6, it is preferable to use one, which normally maintains a disengaged state and engages on the basis of an electric signal or the like.

A sprocket 35 is connected at an end of each drive shaft on the side away from the clutch 6. A pair of sprockets 36 are arranged above the sprocket 35 by being spaced apart in the horizontal direction (coinciding with the transferring direction). Further, six rollers 50 are arranged above the pair of sprockets 36 at equal intervals in the horizontal direction. Sprockets (not shown) are respectively connected to these six rollers 50. These sprockets are respectively engaged with a chain 37 wound around and trained among the aforementioned three sprockets 35 and 36.

All the rollers 50 can be simultaneously rotated by starting the aforementioned driving sources 30 and thereby causing the chain 37 to travel. This is the configuration of the conveyor 3. It should be noted that a roller 51 that is disposed by filling the gap between the part conveyors 5 arranged in tandem in the transferring direction is freely rotatable irrespective of the chain 37.

When the driving sources 30 of the part conveyors 5 juxtaposed in the anteroposterior direction are simultaneously started, the clutch 6 is engaged to interlock the two drive shafts 32. This arrangement is provided by taking into consideration a case in which the material to be transferred 2d (FIG. 5) having such an external size as to occupy the entire loading space of the two rows of conveyors 3 is transferred onto this automated guided vehicle 1, and the position of the center of gravity of such a material to be transferred 2d is offset toward either side of the two rows of conveyors 3.

Namely, when a difference occurs between the operating speeds of the two rows of conveyors 3 due to above-described difference in the load, in the process in which the material to be transferred 2d is conveyed up to the center of the conveyors 3 in the transferring direction, one conveyor 3 which operates at a faster speed relatively pulls one end of the material to be transferred 2d in its conveying direction, while the other conveyor 3 which operates at a slower speed relatively pulls the other end of the material to be transferred 2d in an opposite direction to its conveying direction. Thus, a torque for rotating the material to be transferred 2d is generated. For this reason, there arises the problem that the material to be transferred 2d tilts with respect to the two rows of conveyors 3. Accordingly, the driving sources 30 of the part conveyors 5 that are juxtaposed in the transverse direction are mechanically coupled so as to be completely synchronized with each other.

It should be noted that the invention can be implemented in forms incorporating various improvements, corrections, and modifications on the basis of the knowledge of those skilled in the art without departing from the gist of the invention. In addition, the aforementioned phrases "anteroposterior direction" and "transferring direction" are the nomenclature for causing the attitude of the conveyors 3 to correspond to the dolly 4, and these directions can be set irrespectively of the orientation of the dolly 4.

According to the automated guided vehicle in accordance with the invention, since a plurality of conveyors that are individually driven are juxtaposed, in a state in which a material to be transferred is loaded on one conveyor, other materials to be transferred can be transferred onto the other conveyors without moving the material to be transferred loaded on the one conveyor. For this reason, in a state in which a material to be transferred having small external size compared with the loading space of the automated guided vehicle is loaded on one conveyor, other materials to be transferred can be transferred onto the other conveyors. As a result, since other materials to be transferred can be loaded in an empty region of the loading space, the dead space can be reduced, and the function of the automated guided vehicle can be effectively utilized to a maximum.

In addition, in a case where a material to be transferred having such an external size as to occupy the entire loading space is transferred onto the automated guided vehicle, the material to be transferred can be loaded in such a manner as to straddle the plurality of conveyors or can be transferred by simultaneously operating the plurality of conveyors.

Accordingly, it is possible to reduce the dead space and effectively utilize the function of the automated guided vehicle to a maximum irrespective of the external size of the materials to be transferred, thereby making it possible to efficiently transfer the materials to be transferred.

Moreover, the plurality of driving section for individually driving the plurality of conveyors can be interlocked with each other by means of a clutch. The clutch is engaged when a material to be transferred having such an external size as to occupy the entire loading space is transferred onto the automated guided vehicle. As a result, even if a large difference occurs in the load applied to the individual driving section because the position of the center of gravity of the material to be transferred is offset toward any one of the plurality of conveyors, all the driving section can be synchronized with each other completely.

Accordingly, in the process in which the material to be transferred is transferred in such a manner as to straddle the plurality of conveyors, it is possible to reliably prevent the tilting of the material to be transferred due to the difference in the conveying speed of the individual conveyors. This advantage is derived in view of the fact that although the application of DC motors that can be easily controlled and are low in cost is desirable as the driving sources of the driving section, the DC motors have the characteristic that their rotational speeds are liable to be affected by the load.

Further, according to the automated guided according to the invention, each of the plurality of conveyors is comprised of a plurality of part conveyors arranged in tandem and capable of being controlled individually. Therefore, in addition to the above-described advantages, it is possible to obtain an advantage in that in a case where a material to be transferred is loaded on one part conveyor for making up each conveyor, another material to be transferred can be transferred onto another part conveyor in a state in which the one part conveyor is stopped.

Accordingly, it is possible to obtain an advantage in that a plurality of materials to be transferred can be transferred onto the conveyors in order without causing the material to be transferred already loaded on a single conveyor to fall off as the conveyor is operated, which has been the case with the conventional example.

What is claimed is:

1. An automated guided vehicle comprising:
   a plurality of conveyors juxtaposed in an anteroposterior direction which is perpendicular to a transferring direction of said conveyors for transferring at least one item;
   a plurality of driving sections for individually driving the juxtaposed conveyors; and
   a clutch,
   wherein the plurality of driving sections are interlockable with each other by the clutch, and
   wherein each of the plurality of conveyors includes a plurality of part conveyors arranged in tandem in the transferring direction and wherein each of the plurality of part conveyors is capable of being controlled individually.

2. The automated guided vehicle according to claim 1, wherein each of the plurality of conveyors is capable of supporting and transferring a portion of at least one item straddling the plurality of conveyors.

3. The automated guided vehicle according to claim 1, further comprising:
   guide rollers interposing each of the plurality of conveyors therebetween, the guide rollers supported at positions slightly higher than the conveyor.

4. The automated guided vehicle according to claim 1, further comprising:
   an auxiliary roller disposed between the part conveyors arranged in tandem in the transferring direction, the auxiliary roller being freely rotatable irrespective of the part conveyors.

5. The automated guided vehicle according to claim 1, further comprising:

a pair of stopper frames extending upward in a plane perpendicular to a plane defined by the plurality of conveyors at a front end and a rear end respectively of the automated guided vehicle, wherein the automated guided vehicle travels in the direction perpendicular to the transferring direction.

* * * * *